United States Patent [19]

Borodin et al.

[11] Patent Number: 4,986,142
[45] Date of Patent: Jan. 22, 1991

[54] CONTROL MECHANISM FOR COMPOUND TRANSMISSION OF TRANSPORT VEHICLE

[76] Inventors: Fedor N. Borodin, Ulitsa Marxistskaya, 9,kv.514; Solomon I. Gorfinkel, Klenovy bulvar,9/2,korpus 2,kv.II8; Iosif Kurzel, ulitsa Miklukho-Maklaya,43,kv.77, all of, Moscow, U.S.S.R.

[21] Appl. No.: 423,397
[22] PCT Filed: Jan. 7, 1988
[86] PCT No.: PCT/SU88/00008
 § 371 Date: Aug. 30, 1989
 § 102(e) Date: Aug. 30, 1989
[87] PCT Pub. No.: WO89/06194
 PCT Pub. Date: Jul. 13, 1989

[51] Int. Cl.[5] .................... F16H 61/00; F16H 63/00
[52] U.S. Cl. ............................... 74/473 R; 74/477; 475/209
[58] Field of Search .......... 74/473 R, 477, 471 R, 74/335, 337.5; 475/207, 208, 209

[56] References Cited
U.S. PATENT DOCUMENTS

| 3,229,551 | 1/1966 | Shickey | 74/477 |
| 4,060,005 | 11/1977 | Bost | 74/477 X |
| 4,440,037 | 4/1984 | Foxton et al. | 74/477 X |
| 4,621,536 | 11/1986 | Takeuchi | 74/473 R |

FOREIGN PATENT DOCUMENTS 1391584 6/1971 United Kingdom ............ 74/473 R

Primary Examiner—Leslie A. Braun
Assistant Examiner—Khoi Q. Ta
Attorney, Agent, or Firm—Burgess, Ryan and Wayne

[57] ABSTRACT

A compound transmission for a transport vehicle which has a manually operated main gearbox and an auxiliary two-range gearbox tandemly connected therewith and having a high-gear range and low-gear range shifting by a servo actuator. A control mechanism of this compound transmission comprises a device applicable for use as a fail safe device in manual shifting the auxiliary gearbox to low-gear range in case of failure of the servo actuator of the auxiliary gearbox while it is in the high-gear range. The control mechanism is provided with four sliders. The first second and third sliders are shifted by the drive element connected with the manually operated hand lever. The fourth slider is shifted by the servo actuator. The first and the second sliders engage the forward speeds in the main gearbox. The third slider engages the reverse speed in the main gearbox. The fourth slider engages the low-gear range and the high-gear range in the auxiliary two-range gearbox. The fail safe device is a first rest connected with the fourth slider for joint movement and a second rest located opposite the first rest for interaction with the latter and connected with the third slider for joint movement. This device moves forth slider to the low-gear range position when the third slider is shifted from the neutral position to the reverse speed-engaging position by the drive element.

3 Claims, 4 Drawing Sheets

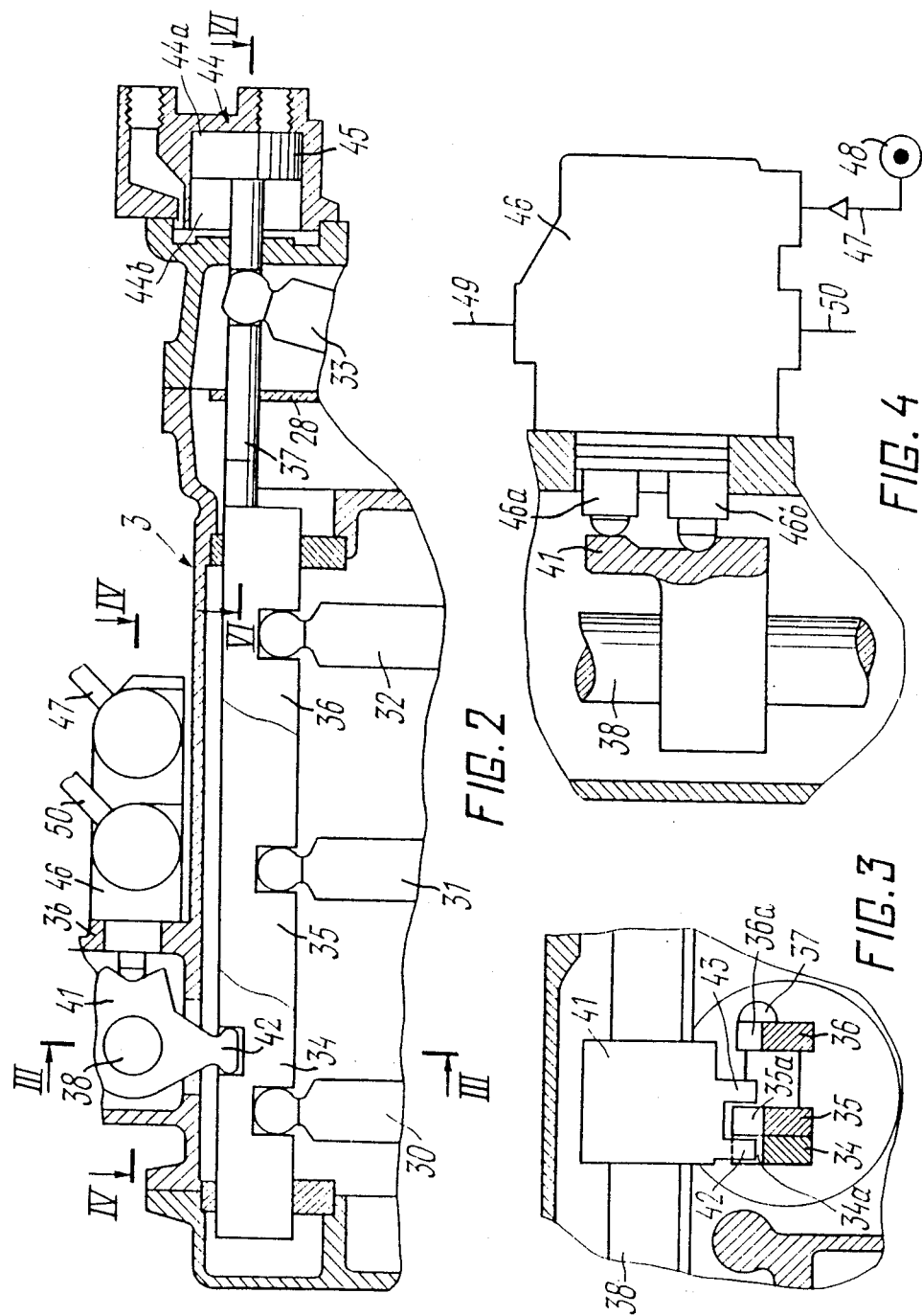

CONTROL MECHANISM FOR COMPOUND TRANSMISSION OF TRANSPORT VEHICLE

TECHNICAL FIELD

The present invention relates to machine building and, more specifically, it relates to a control mechanism of the compound transmission for a transport vehicle.

BACKGROUND OF THE INVENTION

A currently-existing problem consists in providing a reliable control mechanism for the compound transmission for a transport vehicle fitted with a main gearbox and a tandem-connected auxiliary two-range gearbox with high-gear and low-gear ranges.

Transmissions of this type are most characteristic of the motor trucks of medium and high load-carrying capacity. The tandem connection of the auxiliary two-range gearbox with the main gearbox doubles the total number of speeds in the transmission thus improving the running performance of the motor truck and its fuel consumption within a broad range of its service conditions.

However, the necessity of simultaneous control of two gearboxes, the main and auxiliary ones, complicates the control mechanisms of such compound transmissions, thereby impairing their reliability.

Known in the prior art is a control mechanism of the compound transmission for a transport vehicle (DE, C, 1195177) comprising a main gearbox and an auxiliary two-range gearbox connected in tandem to said main gearbox and having a high-gear range and a low-gear range.

The main gearbox providing for four forward speeds comprises constant-mesh gears mounted on parallel rotating shafts, and two gear couplings, one for alternate engagement of two forward speeds and the other one for alternate engagement of two additional forward speeds. The auxiliary two-range gearbox is a planetary mechanism and has a toothed coupling intended for alternate engagement of the low-gear (step-down) range and a high-gear (direct speed) range.

The control mechanism of this compound transmission comprises a casing, a hand lever articulated with said casing, a shaft installed in the casing, said shaft being linked kinematically with the hand lever and having pins engaging the drive links of the toothed couplings of the main gearbox, a pneumatic actuator for moving the toothed coupling of the auxiliary two-range gearbox, and a system of valves for controlling said pneumatic actuator.

The hand lever has a handle operated by the vehicle driver and is installed on the casing of the transmission control mechanism so that the lever can be shifted over a "double-H" path. On shifting the lever handle in a transverse direction, the lever turns the shaft so as to select the speeds in the main gearbox, while on longitudinal movement of the lever handle, said lever moves the same shaft axially in one direction or other so that the selected speed is mechanically engaged in the main gearbox.

On shifting the lever handle over one half of the "double-H" path, the speeds are successively engaged in the main gearbox at one range of the auxiliary two-range gearbox. When the lever handle is shifted transversely from one half of the "double-H" path to its other half, the valves control the pneumatic actuator intended to change ranges in the auxiliary two-range gearbox. As the lever handle is further moved over the second half of the "double-H" path, again the main gearbox speeds are successively engaged but now in the other range of the auxiliary two-range gearbox.

The above-described control mechanism of the compound transmission provides for simple control of a transmission with a large number of speeds by shifting the hand lever handle through the same path as that of the hand lever handle of a transmission having half as many speeds.

However, in case of failure of the pneumatic actuator or of one element of the system of valves controlling said pneumatic actuator, it becomes impossible to shift the ranges in the auxiliary two-range gearbox.

In such a case, when the high-gear range is engaged the vehicle will be unable to start from rest and move at a low speed to a repair shop.

Another known control mechanism of the compound transmission for a transport vehicle (DE, C, 3000577) has a main gearbox and a tandem-connected two-range auxiliary gearbox with the high-gear and low-gear ranges.

This mechanism comprises a casing, a first and second sliders which slide in the casing and serve for engaging four forward speeds in the main gearbox, a third slider for engaging the reverse speed in the main gearbox, also a shaft kinematically linked with the hand lever for the selective shifting of the first, second and third sliders from the neutral position to the gear-engaging positions and back, said shaft being installed in the casing with a provision for rotation and axial movement.

There is a valve for controlling the pneumatic actuator of the auxiliary two-range gearbox, said valve being installed on the casing and operated by a cam connected with the shaft.

The third slider in this mechanism can be used for engaging an auxiliary fifth forward speed in the main gearbox which, as well as the reverse speed, can be engaged only in the low-gear range of the auxiliary two-range gearbox. The auxiliary fifth forward speed in the main gearbox in combination with the low-gear range of the auxiliary gearbox provides for the lowermost, the so-called "creeping" speed in the transmission.

The provision of the third slider in the control mechanism of the compound transmission widens the service capabilities of said transmission.

However, this control mechanism also does not ensure the possibility of shifting ranges in the auxiliary two-range gearbox in case of failure of the pneumatic actuator.

Still another known control mechanism of the compound transmission for a transport vehicle (DE, C, 3333423) comprises a main gearbox and a tandem-connected auxiliary two-range gearbox with high-gear and low-gear ranges.

This control mechanism of the compound transmission comprises a casing, the slide-fitted first and second sliders for engaging the forward speeds in the main gearbox, the third slider for engaging the reverse speed in the main gearbox and the fourth slider for throwing in the low-gear range and high-gear range in the auxiliary two-range gearbox.

The known control mechanism of the compound transmission comprises a drive element kinematically connected with the hand lever and intended for selective shifting of the first, second and third sliders from the neutral position to the speed-engaging positions and back, said drive element being movably installed in the casing.

The mechanism also comprises an actuator for shifting the fourth slider to the low-gear and high-gear range engaging positions, said actuator being controlled by said drive element.

Said drive element in said known control mechanism of the compound transmission has the form of a shaft installed in the casing with a provision for rotation and axial movement. The hand lever has a handle shifted manually over the "double-H" path transversely between several neutral positions and longitudinally from each neutral position to the required positions of engaging the gearbox speeds.

The shaft and the hand lever are kinematically linked by a device providing for axial movement of the shaft during said transverse shifting of the lever handle and for turning said shaft during the longitudinal shifting of said lever handle.

The actuator for shifting the fourth slider in the known control mechanism of the compound transmission is made in the form of a double action pneumatic cylinder whose piston is linked with the slider.

This known control mechanism of the compound transmission for a transport vehicle provides for engaging up to nine forward speeds and one reverse speed by means of the manually operated hand lever which is shifted similarly to the hand lever in other known transmissions with a lesser number of speeds and by means of an actuator powered by its own source of energy and is controlled by a hand lever.

However, in case of failure of the actuator or its source of energy, it becomes impossible to shift the ranges in the auxiliary two-range gearbox. If failure has occurred in the high-gear range of the auxiliary two-range gearbox, the transport vehicle cannot start from rest and move at a low speed to a repair shop.

SUMMARY OF THE INVENTION

The main object of the present invention lies in providing a control mechanism of the compound transmission for a transport vehicle whose design would permit the low-gear range of the auxiliary two-range gearbox to be engaged in case of failure of the actuator for moving the fourth slider.

This object is achieved by providing a control mechanism for the compound transmission of a transport vehicle, said transmission comprising a main gearbox with a neutral forward speed and a reverse speed and tandemly connected therewith an auxiliary two-range gearbox with high-gear and low-gear ranges, said mechanism comprising a hand lever, a casing with a first and a second slider slidingly installed in said casing for engaging the forward speeds in the main gearbox, a third slider for engaging the reverse speed in the main gearbox and a fourth slider for engaging the low-gear range and the high-gear range in the auxiliary two-range gearbox, and incorporating a drive element kinematically-linked with the hand lever intended selective shifting of the first, second and third sliders from the neutral position to the speed-engaging positions and back, movably installed in said casing, and an actuator for shifting the fourth slider into the low-gear range position and into the high-gear range position, according to the invention, there is provided a device for shifting the fourth slider to the low-gear range position when the third slider is moved from the neutral to the speed-engaging position under the action of said drive element, said device comprising a first element connected for joint movement with the fourth slider and a second element arranged opposite to the first element, intended for interaction therewith, said second being connected for joint movement with the third slider.

Introduction into the control mechanism of the compound transmission for a transport vehicle the device for shifting the fourth slider to the position of engaging the low-gear range when the third slider is moved from neutral to the speed-engaging position by the drive element kinematically connected with the hand lever permits the low-gear range to be positively and mechanically engaged in the auxiliary two-range gearbox by the hand lever in case of failure of the fourth slider actuator.

The provision in said fourth slider actuator of the first element connected for joint movement with the fourth slider and of the second element located opposite to the first element, interacting with the latter and intended for joint movement with the third slider makes it possible to simply and efficiently move the fourth slider to the low-gear range position when the third slider is shifted from neutral to the speed-engaging position by the drive element.

It is practicable that the third and fourth sliders should be arranged actually along one and the same line, and that the first and second elements of the device for shifting the fourth slider should be made in the form of stops rigidly connected with the corresponding sliders.

The arrangement of the third and fourth sliders in essence along a straight line and the realization of said interacting elements in the form of rest rigidly connected with the corresponding sliders permits making the simplest and reliable mechanism for controlling a compound transmission, particularly when the travel of the fourth slider from the high-gear range to the low-gear range position in the auxiliary two-range gearbox is basically equal to the travel of the third slider from the neutral position to the reverse speed engaging position in the main gearbox.

It is recommended that the third slider and the fourth slider should be arranged essentially in parallel with, and at a distance from, each other and that said device for shifting the fourth slider should comprise an articulated-lever unit incorporating an auxiliary slider movably installed in the casing and arranged essentially along the same line with said third slider and a lever articulated to the slider with its ends resting respectively on the fourth slider and on the support secured in the casing, the first element and second element of the device for shifting the fourth slider being made in the form of rests rigidly connected with the respective sliders.

The arrangement of the third and fourth sliders in parallel with, and at a distance from, each other and the provision in the mechanism for moving the fourth slider of an articulated-lever unit installed in the casing and intended to connect one of the interacting elements with the corresponding slider makes it possible to create a simplest and reliable control mechanism of the compound transmission, all the more so when the travel of the fourth slider from the low-gear range position in the auxiliary two-range gearbox differs from the travel of the third slider from the neutral position to the reverse speed engaging position in the main gearbox.

Thus, the control mechanism of the compound transmission realized, according to the present invention, permits engaging the low-gear range in the auxiliary two-range gearbox in case of failure of the fourth slider actuator.

The claimed control mechanism of the compound transmission is noted for a comparatively simple and reliable design, and convenience in operation.

Given below is a description of a concrete embodiment of the present invention with reference to the accompanying drawings.

BRIEF DESCRIPTION OF DRAWINGS

FIG. 2 is a schematic view of the control mechanism of the compound transmission, according to the present invention, longitudinal section;

FIG. 3 is a section along line III—III in FIG. 2;

FIG. 4 is a section along line IV—IV in FIG. 2;

BEST MODE FOR CARRYING OUT THE INVENTION

Figure 1:
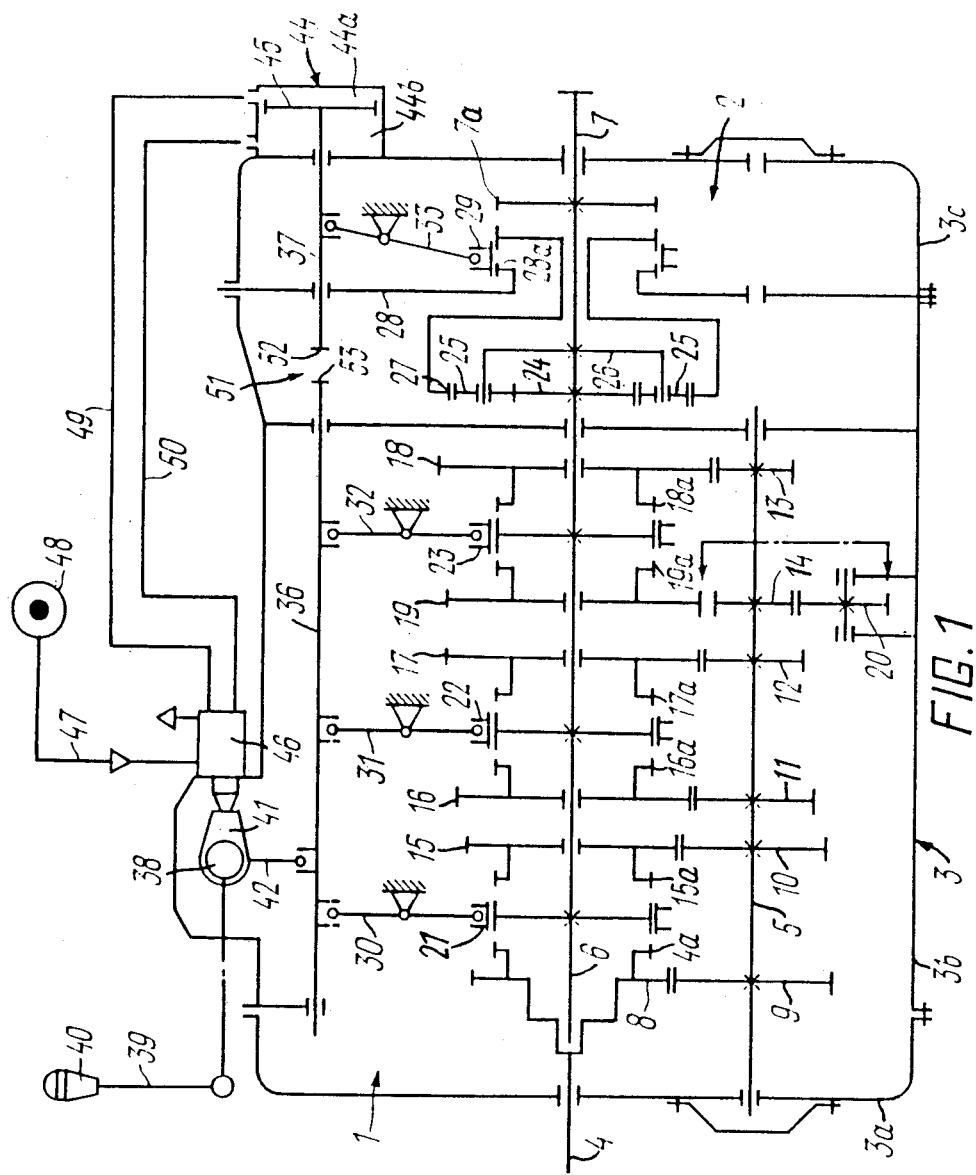
FIG. 1 is a kinematic diagram of the compound transmission and its control mechanism, according to the present invention.

The control mechanism of the compound transmission for a transport vehicle, namely, motor truck, realized according to the present invention is intended for use in the compound transmission incorporating a main gearbox 1 (FIG. 1) and a tandem-connected auxiliary two-range gearbox 2 having a high-gear range and a low-gear range.

Both gearboxes 1 and 2 have a common casing 3 consisting of three rigidly interconnected sections 3a, 3b and 3c.

Installed in the casing 3 on conventional bearings (not shown) are the driving shaft 4 of the main gearbox 1, the countershaft 5 of the main gearbox 1 installed in parallel with the driving shaft 4, the driven shaft 6 of the main gearbox 1 which serves at the same time as the driving shaft of the auxiliary two-range gearbox 2 and is arranged coaxially with the driving shaft 4 of the main gearbox 1, and the driven shaft 7 of the auxiliary two-range gearbox 2 installed coaxially with the shafts 4 and 6.

The driving shaft 4 is adapted for coupling by a friction clutch of a conventional design (not shown) with the vehicle engine crankshaft (not shown) of a conventional design. The driven shaft 7 is adapted for connection via a propeller shaft (not shown) of a conventional design with the final drive of the driving axle (not shown) of the transport vehicle, also of a conventional design.

Made integrally with the driving shaft 4 is the driving pinion 8 which is in constant mesh with the driven gear 9 secured on the countershaft 5. Said countershaft 5 also carries gears 10, 11, 12, 13, 14.

Installed in bearings (not shown) of a conventional design on the driven shaft 6 of the main gearbox 1 are gears 15, 16, 17, 18, 19. The gears 15, 16, 17, 18 engage the forward speeds in the main gearbox 1 and are in constant mesh with the gears 10, 11, 12, 13, respectively, of the countershaft 5. The gear 19 is intended for throwing in a reverse speed in the main gearbox 1 and is in constant mesh with the intermediate gear 20 which, in turn, is in constant mesh with the gear 14 of the countershaft 5. The intermediate gear 20 is installed on bearings (not shown) of a conventional design housed in the casing 3 and is located beyond the limits of the plane passing through the geometrical axes of the shafts 4, 5 and 6 (in FIG. 1 the gear 20 conventionally is shown in the plane of the drawing wherein lie the geometrical axes of the shafts 4, 5 and 6).

Mounted on the shaft 6 are axially movable gearshift toothed couplings 21, 22, 23 of a conventional design, fixed for joint rotation with the shaft 6. The coupling 21 is intended to connect the driving shaft 4 or gear 15 with the driven shaft 6, i.e. for engaging one of the two highest forward speeds in the main gearbox 1. For this purpose the shaft 4 has connecting teeth 4a and the gear 15 has connecting teeth 15a.

The coupling 22 connects the gear 16 or gear 17 with the driven shaft 6, i.e. it engages one of the two lowest forward speeds in the main gearbox 1. For this purpose, the gear 16 has connecting teeth 16a and the gear 17 has connecting teeth 17a.

The coupling 23 is intended to connect the gear 18 or gear 19 with the driven shaft 6, i.e. to engage either the lowest forward speed or the reverse speed in the main gearbox 1. For this purpose, the gear 18 has connecting teeth 18a and the gear 19 has connecting teeth 19a.

The toothed gearshift couplings 21, 22, 23 have synchronizers (not shown) of a conventional design. In FIG. 1 the couplings 21, 22, 23 are shown in the neutral position wherein the shaft 4 and gears 15, 16, 17, 18, 19 are not connected with the shaft 6.

Secured on the end of the shaft 6 (R.H end in FIG. 1) is the driving sun gear 24 of the auxiliary two-range gearbox 2. The gear 24 is in constant mesh with the planet pinions 25 installed on bearings (not shown) of a conventional design on the pinion carrier 26 rigidly connected with the driven shaft 7 of the auxiliary two-range gearbox 2. The planet pinions 25 are in constant mesh with the crown gear 27.

The auxiliary two-range gearbox 2 has a spacer 28 in the form of a plate set between the portions 3b and 3c of the casing 3 and connected rigidly therewith, and a movable toothed gearshift coupling 29 intended to connect the crown gear 27 either with the driven shaft 7 or with the spacer 28 for engaging either the high-gear range or the low-gear range in the auxiliary two-range gearbox 2.

For this purpose, the driven shaft 7 and the spacer 28 have connecting teeth 7a and 28a, respectively.

The coupling 29 is shown in FIG. 1 in a position in which it connects the crown gear 27 with the spacer 28, i.e. in the engaged low-gear range position. The coupling 29 has a synchronizer (not shown) of a conventional design.

Articulated in the casing 3 are shift forks 30, 31, 32, 33 connected with gearshift couplings 21, 22, 23 and 29, respectively.

The control mechanism of the above-described compound transmission comprises a casing made integral with the casing 3 of the gearboxes 1 and 2 and designated by the same reference number 3. Slide-fitted in the casing 3 on guides (not shown) secured in the casing 3 are the first slider 34 (FIG. 2), second slider 35, third slider 36 and fourth slider 37.

The sliders 34, 35, 36 are arranged parallel with the driven shaft 6 of the main gearbox 1, side by side with each other.

The first slider 34 is connected with the fork 30 (FIG. 2) and is intended to engage the two highest forward speeds in the main gearbox 1. The second slider 35 is connected with the fork 31 and engages the two lowest forward speeds in the main gearbox 1. The third slider 36 is connected with the fork 32 and is intended to engage the reverse speed and the lowest forward speed in the main gearbox 1.

FIG. 2 shows the sliders 34, 35, 36 in the neutral position wherein the couplings 21, 22, 23 (FIG. 1) are also in the neutral position.

The fourth slider 37 (FIG. 2) is arranged parallel to the driven shaft 7 (FIG. 1) of the auxiliary two-range gearbox 2, is connected with the fork 33 and intended to engage the low-gear range and the high-gear range in the auxiliary two-range gearbox 2. In FIGS. 1 and 2 the slider 37 is shown in the low-gear range position.

Figure 5:
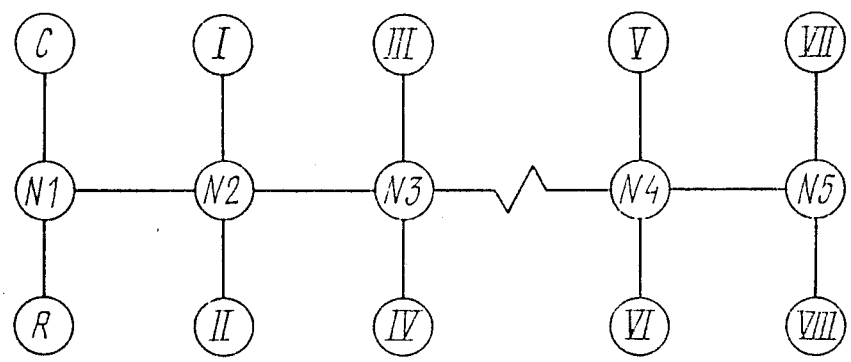
FIG. 5 is a gearshift diagram, i.e. positions of the hand lever knob.

The control mechanism of the compound transmission comprises also a drive element 38 (FIGS. 1, 2, 3, 4) linked kinematically with the hand lever 39 (FIG. 1) and intended for selective shifting of the sliders 34, 35, 36 (FIG. 2) from the neutral position to the speed-engaging positions and back. The drive element 38 is made in the form of a shaft which is designated by the same reference number 38 and is installed in section 3b of the casing 3 with a provision for rotating around its axis (not shown) and moving axially along said axis in the direction transverse with relation to the sliders 34, 35, 36. The hand lever 39 has a handle 40 (FIG. 1) located in the truck cab (not shown) so that the handle 40 of the lever 39 can be moved manually over the "double-H" path (FIG. 5) in a lateral direction between its several neutral positions N 1, N 2, N 3, N 4 and N 5 and longitudinally from each neutral position N 1, N 2, N 3, N 4, N 5 to the speed-engaging positions, i.e., respectively, from position N 1 to position C and R, from position N 2 to positions I and II, from position N 3 to positions III and IV, from position N 4 to positions V and VI and from position N 5 to positions VII and VIII.

The kinematic linkage of the drive element 38 shown by the dot-and-dash line in FIG. 1 with the hand lever 39 is realized by means of any known mechanism (not shown) suitable for the purpose and ensuring axial motion of the drive element 38 when the handle 40 of the lever 39 is moved laterally and turning of the drive element 38 in one direction or the other when the handle 40 of the lever 39 is shifted longitudinally from positions N 1, N 2, N 3, N 4, N 5. Said known mechanism is not dealt with here so as not to obscure the essence of the invention.

The cam 41 rigidly connected with the shaft 38 has two protruding pins 42, 43 (FIG. 3) arranged at a distance from each other along the geometrical axis of the shaft 38. Each slider 34, 35, 36 has a slot of its own designated, respectively, 34a, 35a, 36a which are arranged essentially on one and the same line when the sliders 34, 35, 36 are in neutral. The pins 42, 43 are set at such a distance from each other that, irrespective of the position of the shaft 38 along its geometrical axis, one of the pins 42 or 43 enters one of the slots 34a, 35a or 36a.

The control mechanism of the compound transmission comprises an actuator 44 (FIG. 1) for shifting the fourth slider 37 to the low-gear range ON position and to the high-gear range ON position, said actuator being linked kinematically with the drive element 38.

The actuator 44 (FIG. 2) is a double action pneumatic cylinder secured on the casing 3 and designated by the same Ref. No. 44. The pneumatic cylinder 44 accommodates a movable piston 45 dividing the space of the cylinder 44 into two working chambers 44a and 44b. The piston 45 is rigidly connected with the fourth slider 37.

Section 3b (FIG. 1) of the casing 3 is mounted with a valve 46 provided with two pushrods 46a, 46b (FIG. 4) intended for interacting with the cam 41 and thus controlling the pneumatic cylinder 43. The valve 46 communicates through the pipeline 47 (FIGS. 1, 4) with the compressed air source 48; through the pipeline 49 it communicates with the working chamber 44a (FIG. 2) of the pneumatic cylinder 44 and through the pipeline 50 (FIG. 4). it communicates with the working chamber 44b (FIGS. 1, 2) of the pneumatic cylinder 44.

In other versions the actuator 44 may be either hydraulic or electric and have appropriate control units driven by the shaft 38.

The control mechanism of the compound transmission has a device 51 (FIG. 1) for moving the fourth slider 37 to the low-gear range position when the third slider 36 is shifted from the neutral position to the speed-engaging position, e.g. engaging the reverse speed as shown in FIG. 1. This device 51 comprises the first element 52 (FIGS. 6, 6a) connected for joint movement with the fourth slider 37, and the second element 53 located opposite the first element 52 and intended for interaction with it, said second element 53 connected for joint movement with the third slider 36.

Figure 6C:
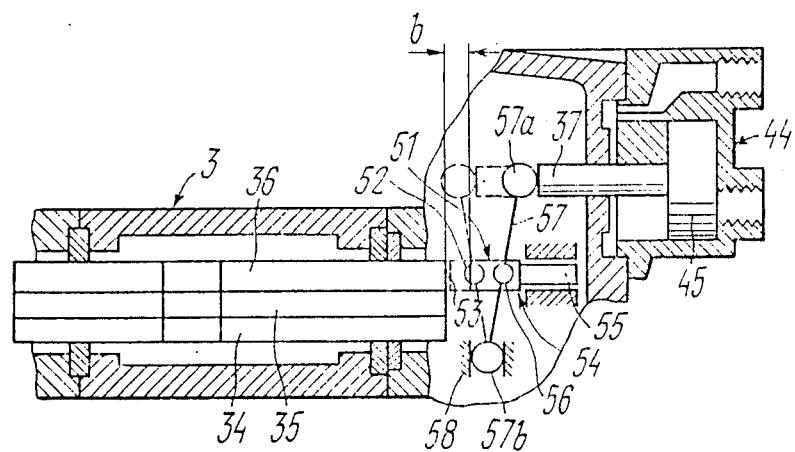
FIG. 6c is a section along line VI—VI in FIG. 2 when the third slider and fourth slider are arranged essentially in parallel with, and at a distance from, each other, the gearbox incorporates an articulated-lever unit with the continuous lines showing this unit corresponding to the low-gear range in the auxiliary two-range gearbox while the dash-dot lines, to the high-gear range in the auxiliary two-range gearbox.
Figure 6:
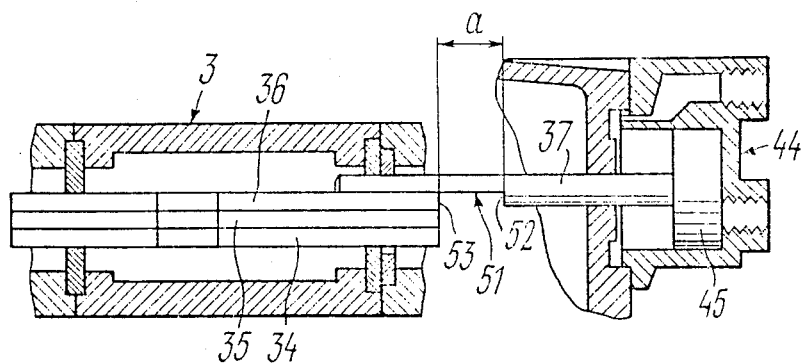
FIG. 6 is a section along line VI—VI in FIG. 2 when the third and fourth sliders are arranged in essence along one and the same line with the main gearbox in neutral and the auxiliary two-range gearbox in the low-gear range position.
Figure 6A:
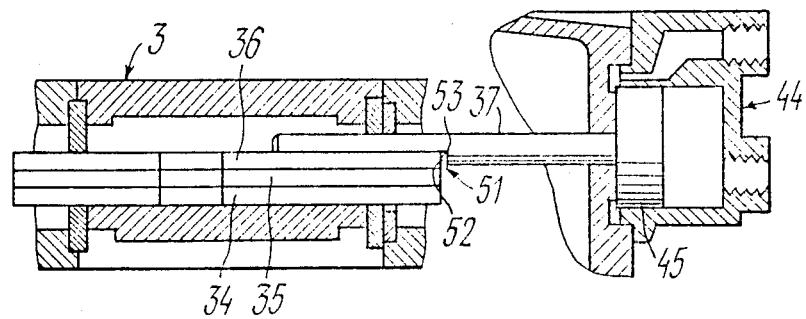
FIG. 6a—same as in FIG. 6 with the main gearbox in neutral and the auxiliary two-range gearbox in the high-gear range position.
Figure 6B:
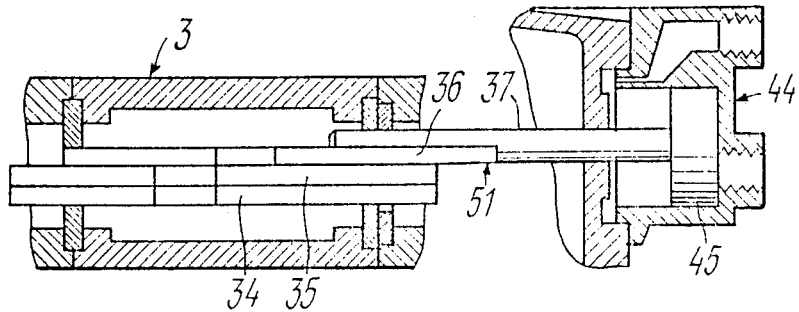
FIG. 6b—same as in FIG. 6 with the main gearbox in the reverse speed position.

In this version of the device 51 wherein the third slider 36 and fourth slider 37 are arranged essentially along one and the same line as shown in FIGS. 6, 6a, 6b, the first element 52 is, essentially, a rest rigidly connected with the slider 37 and designated by the same reference number 52 while the second element 53 is also a rest rigidly connected with the slider 36 and designated by the same reference number 53.

This design of the device 51 is most efficient when the travel of the fourth slider 37 from the high-gear range position to the low-gear range position in the auxiliary two-range gearbox 2 is basically equal to the travel of the third slider 36 from the neutral position to the reverse speed position in the main gear box 1.

If the travel of the fourth slider 37 from the high-gear range position to the low-gear range position in the auxiliary two-range gearbox 2 differs substantially from the travel of the third slider 36 from the neutral position to the reverse-speed position in the main gearbox 1, the third slider 36 and the fourth slider 37 are arranged basically parallel to, and at a distance from, each other as shown in FIG. 6c, the device 51 for shifting the fourth slider comprises an articulated-lever unit 54 installed in the casing 3.

The articulated-lever unit 54 comprises an additional slider 55 arranged essentially in line with the third slider 36 parallel to the fourth slider 37, installed slidingly in the casing 3 and rigidly connected with the first element 52 which has the form of a rest on the slider 55. The articulated-lever unit 54 is intended for connecting the elements 52, 53 with the sliders 36, 37.

Connected with the slider 55 by the joint 56 of a known design is a two-arm lever 57 which has spherical ends 57a, 57b, one end 57a resting on the slider 37 and the other end 57b, on the support 58 which is secured in the casing 3. The ratio of the lengths of arms of the lever 57 is selected so that the travel of the additional slider 55 on shifting the fourth slider 37 from the high-gear range position to the low-gear range position in the auxiliary two-range gearbox 2 is essentially equal to the travel of the third slider 36 from the neutral position to the reverse-speed position in the main gearbox 1.

The control mechanism of the compound transmission for a transport vehicle, according to the present invention, functions as follows.

In the initial position the sliders 34, 35, 36 and toothed gearshift couplings 21, 22, 23 linked with these sliders by means of forks 30, 31, 32 occupy the neutral position wherein the driven shaft 6 of the main gearbox 1 is not linked kinematically with the driving shaft 4 while the slider 37 and the toothed gearshift coupling connected thereto by the fork 33 is in the low-gear range position in which the crown gear 27 of the auxiliary two-range gearbox 2 is connected with the spacer 28 and locked against rotation.

The handle 40 of the hand lever 39 may be in any one position N 1, N 2, N 3. The working chamber 44b of the pneumatic cylinder 44 is in communication with the compressed air source 48 via the pipeline 50, valve 46 and pipeline 47 while the working chamber 44a of the pneumatic cylinder 44 communicates with the atmosphere through the pipeline 49 and valve 46.

In the initial position of mechanisms, the engine torque is not transmitted by the transmission.

To start the vehicle from rest with the engine running, the driver releases the clutch (not shown), shifts the handle 40 of the hand lever 39 to position N 2 then to the position N 1 and engages the clutch.

When the handle 40 of the hand lever 39 is shifted to position N 2, the pin 42 enters the slot 35a of the slider 35, while shifting the handle 40 of the hand lever 39 to position N 1 turns the shaft 38 and moves the slider 35 to the left in FIG. 2.

Acting via fork 31, the slider 35 shifts the toothed coupling 22 to the right in FIG. 1 to the position wherein it interconnects the gear 17 and the driven shaft 6 of the main gearbox 1. In this position the first, i.e. the lowest forward speed is engaged in the main gearbox 1 which, in combination with the low-gear range in the auxiliary two-range gearbox 2 ensures the engagement of the first forward speed in the compound transmission.

After engagement of the clutch, the torque is transmitted from the engine to the driving shaft 4, then it is transmitted through a pair of gears 8, 9 to the countershaft 5 of the main gearbox 1 and, via gears 12, 17 and toothed coupling 22, to the driven shaft 6 of the main gearbox 1. Further, the torque is transmitted via the sun gear 24 and planet pinions 25 rolling around the immovably fixed crown gear 27 to the planet carrier 26 connected with the driven shaft 7 and transmitted therefrom to the wheels (not shown) of the transport vehicle.

To change from the first to the second forward speed in the transmission, the vehicle driver releases the clutch, shifts the handle 40 of the hand lever 39 from position N 1 through position N 2 to position II and engages the clutch. During this gearshifting the shaft 38 turns and the slider 35 is moved to the right in FIG. 2. Simultaneously, the slider 35 shifts the toothed coupling 22 via fork 31 leftward in FIG. 1, to a position wherein said coupling interconnects the gear 16 and the driven shaft 6 of the main gearbox 1. In this position the second forward speed is engaged in the main gearbox 1 which, in combination with the low-gear range in the auxiliary two-range gearbox 2 ensures the second forward speed in the transmission.

After the engagement of the clutch, the engine torque is transmitted by said clutch to the driving shaft 4, then it is transmitted via a pair of gears 8, 9 to the countershaft 5 of the main gearbox 2, then through the gears 11, 16 and the toothed coupling 22 it is transmitted to the driven shaft 6 of the main gearbox 1 and further along the same route as in the first speed.

When the second forward speed is changed to the third forward speed of the transmission, the vehicle driver shifts the handle 40 of the hand lever 39 from position II via positions N 2 and N 3 to position III and again engages the clutch. During this shifting the shaft 38 turns and the slider 35 and the toothed coupling 22 are moved to neutral; then the shaft 38 moves axially and the pin 42 comes out of the slot 35a of the slider 35 and into the slot 34a of the slider 34, the shaft 38 turns, and the slider 34 moves to the left in FIG. 2. Acting via fork 30, the slider 34 shifts the toothed coupling 21 to the right in FIG. 1, i.e. to a position in which said coupling interconnects the gear 15 and the driven shaft 6 in the main gearbox 1.

Thus, the third forward speed is engaged in the main gearbox 1 which, in combination with the low-gear range in the auxiliary two-range gearbox 2 ensures engagement of the third forward speed in the compound transmission.

After the engagement of the clutch, the engine torque is transmitted by said clutch to the driving shaft 4, then via a pair of gears 8, 9 to the countershaft 5 of the main gearbox 1, through the gears 10, 15 and coupling 21 to the driven shaft 6 of the main gearbox 1 in the same sequence as in the first and second speeds.

To change from the third to the fourth speed of the transmission, the driver of the transport vehicle releases the clutch, shifts the handle 40 of the hand lever 39 from position III through position N 3 to position IV and engages the clutch again. During these motions the shaft 38 turns and the slider 34 moves to the right in FIG. 2.

Acting through the fork 30, the slider 34 moves the toothed coupling 21 to the left in FIG. 1, i.e. to a position wherein it connects the driving shaft directly with the countershaft 6 of the main gearbox 1. This engages the fourth (direct) forward speed in the main gearbox 1 which, in combination with the low-gear range in the auxiliary two-range gearbox 2, produces the fourth forward speed in the transmission. As soon as the clutch is engaged, the engine torque becomes to be transmitted to the driving shaft 4, then it is transmitted through coupling 21 to the driven shaft 6 of the main gearbox 1 and further on, just as in the first, second and third speeds.

To change from the fourth to the fifth speed in the transmission, the driver of the transport vehicle disengages the clutch, shifts the handle 40 of the hand lever 39 from position IV through positions N 3 and N 4 to position V and engages the clutch. Shifting of the handle 40 of the hand lever 39 from position VI to position N 3 is accompanied by the turning of shaft 38 and movement of the slider 35 and toothed coupling 21 to the neutral position while the shifting of the knob 40 of the hand lever 39 from position N 3 to position N 4 is accompanied by axial movement of the shaft 38.

Meanwhile the pin 42 leaves the slot 34a of the slider 34 and the pin 43 enters the slot 35a of the slider 35. Simultaneously, the cam 41 shifts the pushrods 46a, 46b of the valve 46 which connects the pipeline 50 with the atmosphere and the pipeline 49 via pipeline 47, with the compressed air source 48.

Under the pressure of air entering the working chamber 44a of the pneumatic cylinder 44, the piston 45 moves the slider 37 to the left in FIG. 1. Said slider 37 acting through the fork 33 moves the toothed coupling 29 to the right in FIG. 1 thereby meshing the crown gear 27 with the driven shaft 7 and engaging the high-gear range in the auxiliary two-range gearbox 2.

In this range the driven shaft 6 of the main gearbox 1 rotates jointly with the driven shaft 7 of the auxiliary two-range gearbox 2. As the handle 40 of the hand lever 39 is moved from position N 4 to position V, the pin 43 shifts the slider 35 to the first forward speed position in the main gearbox 1 which, in combination with the high-gear range in the auxiliary two-range gearbox 2, produces the fifth forward speed in the transmission.

After the engagement of the clutch, the engine torque is transmitted to the driving shaft 4 and therefrom, to the driven shaft 6 in the same way as in the first speed of the transmission which has been described above in detail, and from the driven shaft 6 directly to the driven shaft 7.

When changing from the fifth to the sixth forward speed in the transmission, then from the sixth to the seventh speed and from the seventh to the eighth speed, the driver of the transport vehicle releases the clutch, shifts the handle 40 of the hand lever 39, respectively, from position V through position N 4 to position VI, from position VI through positions N 4 and N 5 to position VII and finally, from position VII through position N 5 to position VIII.

Concurrently, the first forward speed in the main gearbox 1 is shifted to the second speed, from the second to the third speed, and from the third to the fourth speed just as it has been described above. The combination of the second, third and fourth forward speeds in the main gearbox 1 with the high-gear range in the auxiliary two-range gearbox 2 produces, respectively, the sixth, seventh and eighth forward speeds in the transmission.

The downshifting of speeds in the transmission from the eighth to the first speed is carried out by appropriate shifting of the handle 40 of the hand lever 39 with corresponding engagement and disengagement of the clutch.

For backing the vehicle the driver of the standing vehicle with the engine running releases the clutch, sets the handle 40 of the hand lever to position N 1 then shifts it to position R and engages the clutch.

When the handle 40 of the hand lever 39 is set to position N 1 the pin 43 enters the slot 36a of the slider 36 while shifting of said lever 39 to position R turns the shaft 38 and moves the slider 36 to the right in FIGS. 1 and 2.

Acting through the fork 32, the slider 36 shifts the toothed coupling 23 to the left in FIG. 1, to a position in which it meshes the gear 19 with the driven shaft 6 of the main gearbox 1. This results in the engagement of the reverse speed in the main gearbox which, in combination with the low-gear range in the auxiliary two-range gearbox, produces the reverse speed in the transmission.

Inasmuch as the slider 37 at the low-gear range in the auxiliary gearbox occupies the extreme right position in FIG. 1, and the rest 53 of the slider 36 is separated by a clearance "a" (FIG. 6) from the rest 52 of the slider 37 or said rest 53 of the slider 36 is separated by a clearance "b" (FIG. 6c) from the rest 52 of the auxiliary slider 55, the movement of the slider 36 to the right in FIGS. 6 and 6c to the reverse speed position in the main gearbox 1 does not affect the position of the slider 37.

After engaging the clutch, the engine torque is transmitted via said clutch to the driving shaft 4, then through a pair of gears 8, 9 it is transmitted to the countershaft 5 of the main gearbox 1 and through gears 14, 20, 19 and the toothed coupling 23, to the driven shaft 6 of the main gearbox 1, rotating said shaft 6 in the direction contrary to that of the driving shaft 4.

Then the torque is transmitted by the sun gear 24 and planet pinions 25 rolling over the fixed crown gear 27 to the pinion carrier 26 connected with the driven shaft and from the driven shaft 7 it is conveyed to the wheels (not shown) of the transport vehicle, rotating them in the direction contrary to that when the vehicle moves forward.

For moving the vehicle at a very low, so-called "creeping" forward speed, the driver releases the clutch with the engine running, sets the knob 40 of the hand lever 39 to position N 1 then shifts it to position C and engages the clutch.

When the handle 40 of the hand lever 39 is moved to position N 1 the pin 43 enters the slot 36a of the slider 36 while moving the handle 40 of the hand lever 39 to position C turns the shaft 38 and moves the slider 36 to the left in FIGS. 1 and 2.

The slider 36 acting through the fork 32 moves the coupling 23 to the right in FIG. 1, to a position wherein said coupling meshes the gear 18 with the driven shaft 6 of the main gearbox 1. In this position the lowest forward speed is engaged in the main gearbox 1 which, in combination with the low-gear range in the auxiliary two-range gearbox 2, produces the lowest, so-called "creeping" forward speed in the transmission, corresponding to the "creeping" transport speed.

On engaging the clutch, the latter transmits the engine torque to the driving shaft 4, then through a couple of gears 8, 9 it is transmitted to the countershaft 5 of the main gearbox 1, then through gears 13, 18 and toothed coupling 23 to the driven shaft 6 of the main gearbox 1. After that the torque is transmitted via the sun gear 24 and planet pinions 25 rolling over the immovable crown gear 27 to the planet carrier 26 connected with the driven shaft 7 wherefrom it is transmitted to the wheels of the transport vehicle.

The above described gear-shifting process relates to the normal operation of the actuator 44.

If the actuator 44 fails through some defect of the compressed air source 48 or of valve 46 with the high-gear range engaged in the auxiliary two-range gearbox 2, the toothed coupling 29 remains in the right-hand position in FIG. 1 in spite of the fact that the handle 40 of the hand lever 39 has been shifted from position N 4, to position N 3 since the actuator 44 is in this case inoperative. With the toothed coupling 29 in this position, the transport vehicle cannot start from rest.

In such a case, having stopped the vehicle, the driver releases the clutch, sets the handle 40 of the hand lever 39 to position N 1, then to position R and pulls it back to position N 1.

In the control mechanism of the compound transmission wherein the sliders 36 and 37 are arranged essentially along one and the same line, when the actuator 44 is inoperative, the high-gear range is engaged in the auxiliary two-range gearbox 2 and the handle 40 of the hand lever 39 is in position N 1, the sliders 36 and 37 are in the position shown in FIG. 6a. The rest 53 of the slider 36 is located in close proximity to the rest 52 of the slider 37.

As the handle 40 of the hand lever 39 is shifted from position N 1 to position R, the rest 53 of the slider 36 moves together with said slider to the position shown in FIG. 6b and, acting on the rest 52 of the slider 37, forces the slider 37 to the position shown in FIG. 6b wherein the low-gear range is engaged in the auxiliary two-range gearbox 2. The slider 37 acting through the fork 33 shifts the toothed coupling 29 to the left in FIG. 1, i.e. to the position wherein it meshes the crown gear 27 with the spacer 28 thereby engaging the low-gear range in the auxiliary two-range gearbox 2.

When the handle 40 of the hand lever 39 is returned to position N 1, the slider 37 remains in the low-gear range position in the auxiliary gearbox. Then the driver can throw in forward speeds in the main gearbox 1 by the hand lever 39.

In this position it is possible to throw in the first four forward speeds in the transmission which allows the vehicle to continue travelling even in case of failure of the actuator 44 whose function is to change ranges of the auxiliary two-range gearbox.

In the compound transmission control mechanism wherein the sliders 36 and 37 are arranged essentially in parallel with, and at a distance from, each other when the actuator 44 is inoperative, the high-gear range is engaged in the auxiliary two-range gearbox 2 and the handle 40 of the hand lever 39 is in position N 1, the slider 36 occupies the position shown in FIG. 6c while the sliders 55 and 37 and the lever 57 are in the positions shown by the dash-and-dot lines in FIG. 6c. The rest 53 of the slider 36 is located in close proximity to the rest 52 of the slider 55.

As the handle 40 of the hand lever 39 is shifted from position N 1 to position R, the rest 53 of the slider 36 moves jointly with said slider 36 acting on the rest 52 of the slider 55 and forces the slider 55 to a position shown by continuous lines in FIG. 6c. Acting via lever 57, the slider 55 shifts the slider 37 to the position shown by continuous lines in FIG. 6c in which the low-gear range is engaged in the two-range auxiliary gearbox 2.

The slider 37 acting via the fork 33 shifts the toothed coupling 29 to the left in FIG. 1, i.e. to a position wherein it meshes the crown gear 27 with the spacer 28 thereby engaging the low-gear range in the auxiliary two-range gearbox 2.

This permits engaging four first forward speeds in the transmission as has been described hereinabove so that the transport vehicle is capable of travelling even in case of failure of the actuator 44 intended to shift gear ranges in the auxiliary two-range gearbox 2.

In spite of the fact that described above is a compound transmission control mechanism wherein the direction of movement of the slider 37 from the high-gear range position to the low-gear range position in the auxiliary two-range gearbox 2 coincides with the direction of the slider 36 moving from the neutral position to the reverse speed position in the main gearbox 1, it is obvious that a fully similar control mechanism can be realized wherein the direction of movement of the slider 37 from the high-gear range position to the low-gear range position in the auxiliary two-range gearbox 2 would be contrary to the direction of movement of the slider 36 from the neutral position to the lowest forward speed position in the main gearbox 1.

In the latter case, if it becomes necessary to engage the low-gear range in the auxiliary gearbox in case of failure of the actuator 44, the handle 40 of the hand lever 39 should be shifted from the neutral position N 1 to position C.

The above-described control mechanism promotes the reliability of the compound transmission of a transport vehicle consisting of a manually-operated main gearbox and an auxiliary two-range gearbox connected in tandem with said main gearbox and provided with a power-driven actuator.

INDUSTRIAL APPLICABILITY

The present invention can be utilized most efficiently in the compound transmission of a motor truck, said transmission incorporating a main gearbox and a tandem-connected auxiliary two-range gearbox having high-gear and low-gear ranges.

The control mechanism of the compound transmission of a transport vehicle realized in accordance with the present invention can be used in other transport vehicles, such as tractors, road-building machines, etc.

We claim:

1. A control mechanism of a compound transmission for a transport vehicle having a main gearbox (I) with a neutral position, a plurality of forward speed positions and a reverse speed position and tandemly connected to the main gear box, an auxiliary two-range gearbox (2) with a high-gear range position and a low-gear range position, comprising a hand lever (39), a casing (3), a first and a second slider (34, 35) slidingly arranged in said casing (3) for engaging a shifting means for forward speeds in the main gearbox (1), third slider (36) for engaging a shifting means for a reverse speed in the main gearbox (I) and a fourth slider (37) for engaging a shifting means for a low-gear range and a high-gear range in the auxiliary two-range gearbox, and a drive element (38) kinematically linked with the hand lever (39) for selective shifting of the first, second and third sliders (34, 35, 36) from the neutral position to the speed engaging positions and back, movably arranged in the casing (3), and an actuator (43) for shifting the fourth slider (37) into the low gear and high-gear positions, kinematically-linked with said drive element (38), wherein a device (51) for shifting the fourth slider (37) to the low-gear range position when the third slider (36) is moved from the neutral position to the speed-engaging position under the action of said drive element (38), said device comprising a first element (52) arranged for joint movement with the fourth slider (37) and a second element (53) arranged opposite the first element (52) for interaction therewith, said second element (53) being arranged for joint movement with the third slider (36).

2. A control mechanism as claimed in claim 1, wherein the third slider (36) and the fourth slider (37) are arranged to engagingly traverse essentially along the same line, the first element (52) and the second element (53) of the device (51) for shifting the fourth slider (37) being made in the form of rests ridgidly arranged on the corresponding sliders (36, 37).

3. A control mechanism as claimed in claim 1 wherein the third slider (36) and the fourth slider (37) are arranged to traverse essentially parallel lines at a distance from, each other, said device (51) for shifting the fourth slider (37) comprising an articulated-lever unit (54) having an auxiliary slider (55) movably installed in the casing (3), said slider (55) arranged essentially along the same line as said third slider (36), and a lever (57) articulated to the auxiliary slider (55) with its ends resting, respectively, on the fourth slider (37) and on a support (58) arranged in the casing (3), the first element (52) and the second element (53) of the device (51) for shifting the fourth slider (37) being made in the form of rests rigidly arranged on the corresponding sliders (55, 36)".

* * * * *